US011633908B2

(12) United States Patent
Zieringer et al.

(10) Patent No.: US 11,633,908 B2
(45) Date of Patent: Apr. 25, 2023

(54) LATENT CURE RESINS AND RELATED METHODS

(71) Applicant: Formlabs, Inc., Somerville, MA (US)

(72) Inventors: Maximilian Zieringer, Cambridge, MA (US); Alpay Kimyonok, Malden, MA (US)

(73) Assignee: Formlabs, Inc., Somerville, MA (US)

( * ) Notice: Subject to any disclaimer, the term of this patent is extended or adjusted under 35 U.S.C. 154(b) by 373 days.

(21) Appl. No.: 16/289,737

(22) Filed: Mar. 1, 2019

(65) Prior Publication Data

US 2019/0270244 A1  Sep. 5, 2019

Related U.S. Application Data

(60) Provisional application No. 62/637,446, filed on Mar. 2, 2018.

(51) Int. Cl.
| | |
|---|---|
| *B29C 64/129* | (2017.01) |
| *B29C 35/08* | (2006.01) |
| *B33Y 70/10* | (2020.01) |
| *B33Y 80/00* | (2015.01) |
| *B29K 75/00* | (2006.01) |
| *B33Y 10/00* | (2015.01) |
| *B29K 33/00* | (2006.01) |

(52) U.S. Cl.
CPC ........ *B29C 64/129* (2017.08); *B29C 35/0805* (2013.01); *B33Y 70/10* (2020.01); *B29C 2035/0833* (2013.01); *B29K 2033/08* (2013.01); *B29K 2075/00* (2013.01); *B33Y 10/00* (2014.12); *B33Y 80/00* (2014.12)

(58) Field of Classification Search
CPC ............................ B29C 64/20; B29C 64/129
See application file for complete search history.

(56) References Cited

U.S. PATENT DOCUMENTS

| | | | | |
|---|---|---|---|---|
| 3,726,835 A | * | 4/1973 | Bertozzi | C08G 18/6453 528/61 |
| 4,996,282 A | * | 2/1991 | Noren | C08G 18/6705 528/75 |
| 5,006,364 A | * | 4/1991 | Fan | B29C 64/135 427/510 |
| 5,011,635 A | * | 4/1991 | Murphy | B33Y 10/00 264/401 |
| 5,128,235 A | * | 7/1992 | Vassiliou | G03F 7/027 264/401 |

(Continued)

FOREIGN PATENT DOCUMENTS

| | | |
|---|---|---|
| CN | 107735379 A | 2/2018 |
| WO | WO 2017-079502 A1 | 5/2017 |
| WO | WO 2017/112653 A1 | 6/2017 |

OTHER PUBLICATIONS

Invitation to Pay Additional Fees for International Application No. PCT/US2019/020188 mailed Apr. 16, 2019.

(Continued)

*Primary Examiner* — Andrew D Graham
(74) *Attorney, Agent, or Firm* — Wolf, Greenfield & Sacks, P.C.

(57) ABSTRACT

The present disclosure relates generally to curable resins, in particular latent cure resins, and related methods for use in an additive fabrication (e.g., 3-dimensional printing) device.

30 Claims, 7 Drawing Sheets

(56) References Cited

U.S. PATENT DOCUMENTS

| | | | | |
|---|---|---|---|---|
| 5,143,817 A * | 9/1992 | Lawton | .................. | B33Y 10/00 264/401 |
| 5,158,858 A * | 10/1992 | Lawton | .................. | B33Y 30/00 264/401 |
| 5,182,056 A * | 1/1993 | Spence | .................. | B29C 64/40 264/401 |
| 5,198,159 A * | 3/1993 | Nakamura | ............ | B29C 64/135 264/401 |
| 5,236,812 A * | 8/1993 | Vassiliou | .............. | B29C 64/135 430/327 |
| 5,247,180 A * | 9/1993 | Mitcham | ............... | B29C 64/129 250/492.1 |
| 5,248,752 A * | 9/1993 | Argyropoulos | ....... | C07C 271/20 528/49 |
| 5,263,130 A * | 11/1993 | Pomerantz | ............ | G03F 7/0037 345/418 |
| 5,418,112 A * | 5/1995 | Mirle | ..................... | B29C 64/106 430/269 |
| 5,437,964 A * | 8/1995 | Lapin | ..................... | C08G 59/18 430/280.1 |
| 5,476,748 A * | 12/1995 | Steinmann | ............ | C08F 283/00 430/269 |
| 5,476,749 A * | 12/1995 | Steinmann | ............. | B33Y 70/00 430/269 |
| 5,494,618 A * | 2/1996 | Sitzmann | .............. | G03F 7/0037 264/401 |
| 5,495,029 A * | 2/1996 | Steinmann | ............ | C07C 271/12 549/545 |
| 5,674,921 A * | 10/1997 | Regula | .................... | A61L 31/06 522/97 |
| 5,705,116 A * | 1/1998 | Sitzmann | ................ | G03F 7/038 264/401 |
| 5,707,780 A * | 1/1998 | Lawton | ................. | B29C 64/135 430/280.1 |
| 5,783,358 A * | 7/1998 | Schulthess | ............. | C08G 59/68 430/269 |
| 5,807,519 A * | 9/1998 | Suzuki | ................... | B29C 33/40 264/401 |
| 5,972,563 A * | 10/1999 | Steinmann | ............ | G03F 7/0037 430/280.1 |
| 6,099,787 A * | 8/2000 | Melisaris | ................. | C08K 5/17 264/401 |
| 6,100,007 A * | 8/2000 | Pang | ....................... | G03F 7/038 430/269 |
| 6,136,497 A * | 10/2000 | Melisaris | ................ | G03F 7/027 430/269 |
| 6,177,232 B1 * | 1/2001 | Melisaris | ................ | B33Y 10/00 430/280.1 |
| 6,251,557 B1 * | 6/2001 | Lapin | ..................... | B29C 41/003 430/269 |
| 6,323,295 B1 * | 11/2001 | Muhlebach | ............ | C08G 61/00 526/171 |
| 6,423,255 B1 * | 7/2002 | Hoechsmann | ......... | B33Y 70/00 264/113 |
| 6,574,523 B1 * | 6/2003 | Hanna | .................. | B29C 64/135 700/120 |
| 8,501,033 B2 | 8/2013 | Southwell et al. | | |
| 8,741,194 B1 * | 6/2014 | Ederer | .................. | B29C 64/165 264/113 |
| 9,183,325 B2 * | 11/2015 | Wighton | ............... | B29C 64/153 |
| 9,777,097 B2 | 10/2017 | Liu et al. | | |
| 2001/0046642 A1 * | 11/2001 | Johnson | ................ | B29C 64/106 430/280.1 |
| 2001/0050031 A1 * | 12/2001 | Bredt | ...................... | B29C 67/24 106/162.9 |
| 2002/0085054 A1 * | 7/2002 | Tokie | ...................... | B41J 3/407 347/15 |
| 2002/0195746 A1 * | 12/2002 | Hull | ....................... | B29C 64/124 264/401 |
| 2002/0195747 A1 * | 12/2002 | Hull | ....................... | B29C 64/124 264/401 |
| 2003/0083771 A1 * | 5/2003 | Schmidt | ................. | B33Y 10/00 700/119 |
| 2003/0085488 A1 * | 5/2003 | Newell | .................. | B33Y 40/00 264/234 |
| 2004/0023145 A1 * | 2/2004 | Moussa | ................. | B33Y 10/00 430/138 |
| 2004/0135292 A1 * | 7/2004 | Coats | ...................... | B29C 64/40 264/401 |
| 2004/0142274 A1 * | 7/2004 | Thies | ....................... | G03F 7/038 430/269 |
| 2004/0222548 A1 * | 11/2004 | Sano | ..................... | B29C 64/165 264/113 |
| 2004/0222549 A1 * | 11/2004 | Sano | ..................... | B29C 64/165 264/128 |
| 2005/0072519 A1 * | 4/2005 | Johnson | ................... | C09D 4/00 156/275.5 |
| 2005/0084620 A1 * | 4/2005 | Schuurman | ............. | B05D 1/00 427/554 |
| 2005/0101684 A1 * | 5/2005 | You | ........................ | B29C 64/153 522/1 |
| 2005/0167872 A1 * | 8/2005 | Tsubaki | ................ | B29C 64/165 264/113 |
| 2005/0175925 A1 * | 8/2005 | Johnson | ................ | B29C 64/124 430/280.1 |
| 2005/0209361 A1 * | 9/2005 | Detrembleur | ....... | C08G 18/7837 522/183 |
| 2006/0051591 A1 * | 3/2006 | Weikard | ............ | C08G 18/8175 428/423.1 |
| 2006/0235101 A1 * | 10/2006 | Messe | .................. | G03F 7/0037 522/81 |
| 2006/0290032 A1 * | 12/2006 | Sano | ..................... | B29C 64/165 264/494 |
| 2007/0007698 A1 * | 1/2007 | Sano | ..................... | B29C 64/165 264/496 |
| 2007/0060682 A1 * | 3/2007 | Ito | ........................ | C08G 59/687 524/160 |
| 2008/0182078 A1 * | 7/2008 | Johnson | ................ | B29C 64/106 428/195.1 |
| 2009/0020920 A1 * | 1/2009 | Kumagai | ............. | B29C 64/165 264/401 |
| 2010/0140849 A1 * | 6/2010 | Comb | .................. | B29C 64/118 264/401 |
| 2010/0196618 A1 | 8/2010 | Botrie et al. | | |
| 2010/0247938 A1 * | 9/2010 | Abe | ..................... | B29C 64/165 428/500 |
| 2010/0262272 A1 * | 10/2010 | Shkolnik | .............. | B33Y 50/02 700/120 |
| 2011/0195237 A1 * | 8/2011 | Patel | ..................... | G03F 7/0037 428/195.1 |
| 2011/0219973 A1 * | 9/2011 | Gullentops | ............. | B41N 1/22 101/401.1 |
| 2012/0195994 A1 * | 8/2012 | El-Siblani | ............ | B29C 64/124 425/174.4 |
| 2012/0251841 A1 * | 10/2012 | Southwell | ............. | B33Y 70/00 428/704 |
| 2013/0026680 A1 * | 1/2013 | Ederer | .................. | B29C 64/153 264/401 |
| 2013/0090407 A1 * | 4/2013 | Carter | .................. | C08G 59/68 522/170 |
| 2014/0353878 A1 * | 12/2014 | Driessen | ............... | B29C 64/135 264/401 |
| 2015/0014881 A1 * | 1/2015 | Elsey | .................... | B33Y 30/00 264/219 |
| 2015/0056421 A1 * | 2/2015 | Yudovin-Farber | ..... | B33Y 10/00 428/201 |
| 2015/0322291 A1 * | 11/2015 | Salviato | ................ | C09D 11/101 524/591 |
| 2016/0046080 A1 * | 2/2016 | Thomas | .................. | B29C 64/10 264/308 |
| 2016/0052205 A1 * | 2/2016 | FrantzDale | ........... | B29C 64/20 264/401 |
| 2016/0136889 A1 * | 5/2016 | Rolland | ............. | C08F 283/006 264/1.27 |
| 2016/0152833 A1 | 6/2016 | Kostromine et al. | | |
| 2016/0168279 A1 * | 6/2016 | Nesvadba | ............... | C09D 4/00 522/8 |

(56) References Cited

U.S. PATENT DOCUMENTS

| | | | |
|---|---|---|---|
| 2016/0271869 A1* | 9/2016 | Van De Vrie | B29C 64/129 |
| 2017/0165916 A1* | 6/2017 | El-Siblani | B29C 64/124 |
| 2018/0015662 A1 | 1/2018 | Ermoshkin et al. | |
| 2018/0046076 A1* | 2/2018 | Letko | C08G 18/4866 |
| 2018/0229436 A1* | 8/2018 | Gu | B29C 64/40 |
| 2020/0047404 A1* | 2/2020 | Plott | B33Y 10/00 |
| 2020/0190357 A1 | 6/2020 | Rolland et al. | |

OTHER PUBLICATIONS

International Search Report and Written Opinion for International Application No. PCT/US2019/020188 dated Jun. 24, 2019.
Extended European Search Report dated Sep. 23, 2021 in connection with European Application No. 19761683.2.

\* cited by examiner

1. Exemplary formation of the green structure during the primary cure step initiated by photopolymerization 2. Exemplary formation of the final polymer structure during the secondary cure or latent cure step

LATENT CURE RESINS AND RELATED METHODS

CROSS-REFERENCE TO RELATED APPLICATIONS

The present application claims the benefit under 35 U.S.C. § 119(e) of U.S. Provisional Patent Application No. 62/637,446, filed Mar. 2, 2018, titled "Latent Cure Resins And Related Methods," which is hereby incorporated by reference in its entirety.

FIELD OF THE INVENTION

The present invention generally relates to curable resins, in particular latent cure resins, and related methods for use in an additive fabrication (e.g., 3-dimensional printing) device.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build objects by forming successive layers, which are typically cross-sections of the desired object. Typically each layer is formed such that it adheres to either a previously formed layer or a substrate upon which the object is built. In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or to the bottom surface of the build platform.

Every additive manufacturing technology generally requires some form of specialized material. Additive manufacturing techniques using light to cure a liquid material, such as stereolithography (SLA and DLP), into an object require photocurable materials.

Many current additive manufacturing materials are formed from polymeric (meth)acrylates. (Meth)acrylates are useful in 3D printing applications because the monomers and oligomers are highly reactive through radical photopolymerization. This reactivity allows for the printing process to proceed more quickly and efficiently with a higher degree of accuracy. However, the reactivity may also introduce less favorable qualities or limit the types of qualities available in a 3D printing process. The end material may be brittle because the resulting polymer is generally inhomogenous and highly cross-linked. As additive manufacturing pushes to be applicable in more functional prototyping or end-use applications, the material capabilities of (meth)acrylate based polymers may become a limiting factor.

Accordingly there is a need in the art for new materials and expanded material properties for applications of additive manufacturing.

SUMMARY OF THE INVENTION

The present disclosure relates generally to curable resins, in particular latent cure resins, and related methods for use in an additive fabrication (e.g., 3-dimensional printing) device.

According to one or more embodiments, methods of producing an additively-manufactured article are provided. In some embodiments, the method comprises providing a curable material comprising a first precursor component and at least a second precursor component, different than the first precursor component, wherein the first precursor component is configured to cure when subjected to an effective amount of actinic radiation and the second precursor component is configured to cure when subjected to moisture or gas, exposing the curable material to actinic radiation to produce an intermediate polymeric structure, wherein the secondary precursor component is suspended in such intermediate polymer structure, and exposing the intermediate polymeric structure to moisture or gas sufficient to at least partially cure the secondary precursor component, thereby producing the article.

In some embodiments, methods of forming an article in an additive fabrication device configured to fabricate the article by forming layers of solid material on a build platform are provided. In some embodiments, the method comprises providing a curable material comprising a first precursor component and a second precursor component, different than the first precursor component, over the build platform, forming a first layer by at least partially curing the first precursor component, providing the curable material on the first formed layer, forming a second layer by at least partially curing the first precursor component of the curable material deposited on the first layer, and subsequently at least partially curing the second precursor component in the first layer and the second layer.

In certain embodiments, the curable material comprises a mixture of the first precursor component and the second precursor component.

In certain embodiments, the curable material is formed by mixing the first precursor component and the second precursor component prior to providing the composition to build platform.

In certain embodiments, the first precursor component comprises an acrylic or derivatives thereof.

In certain embodiments, the first precursor component comprises a photoinitiator, a pigment, a dye, an additive, and/or a filler.

In certain embodiments, the second precursor component comprises an isocyanate or derivatives thereof.

In certain embodiments, the second precursor component comprises a pigment, a dye, an additive, and/or a filler.

In certain embodiments, curing the first precursor component comprises exposing the first precursor component to an effective amount of actinic radiation.

In certain embodiments, curing the second precursor component comprises exposing the article to humidity, heat, and/or an effective amount of actinic radiation.

In certain embodiments, the effective amount of actinic radiation for curing the second precursor component is different than the effective amount of actinic radiation for curing the first precursor component.

In certain embodiments, the first precursor component comprises a photo-polymerizable compound.

In certain embodiments, the curable material is configured to have a shelf-life of at least 1 months.

In certain embodiments, the formed article comprises an interpenetrating polymer network.

The foregoing is a non-limiting summary of the invention, which is defined by the attached claims.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present disclosure relates generally to latent cure resins and related methods for use in an additive fabrication (e.g., 3-dimensional printing) device.

Figure 1A:
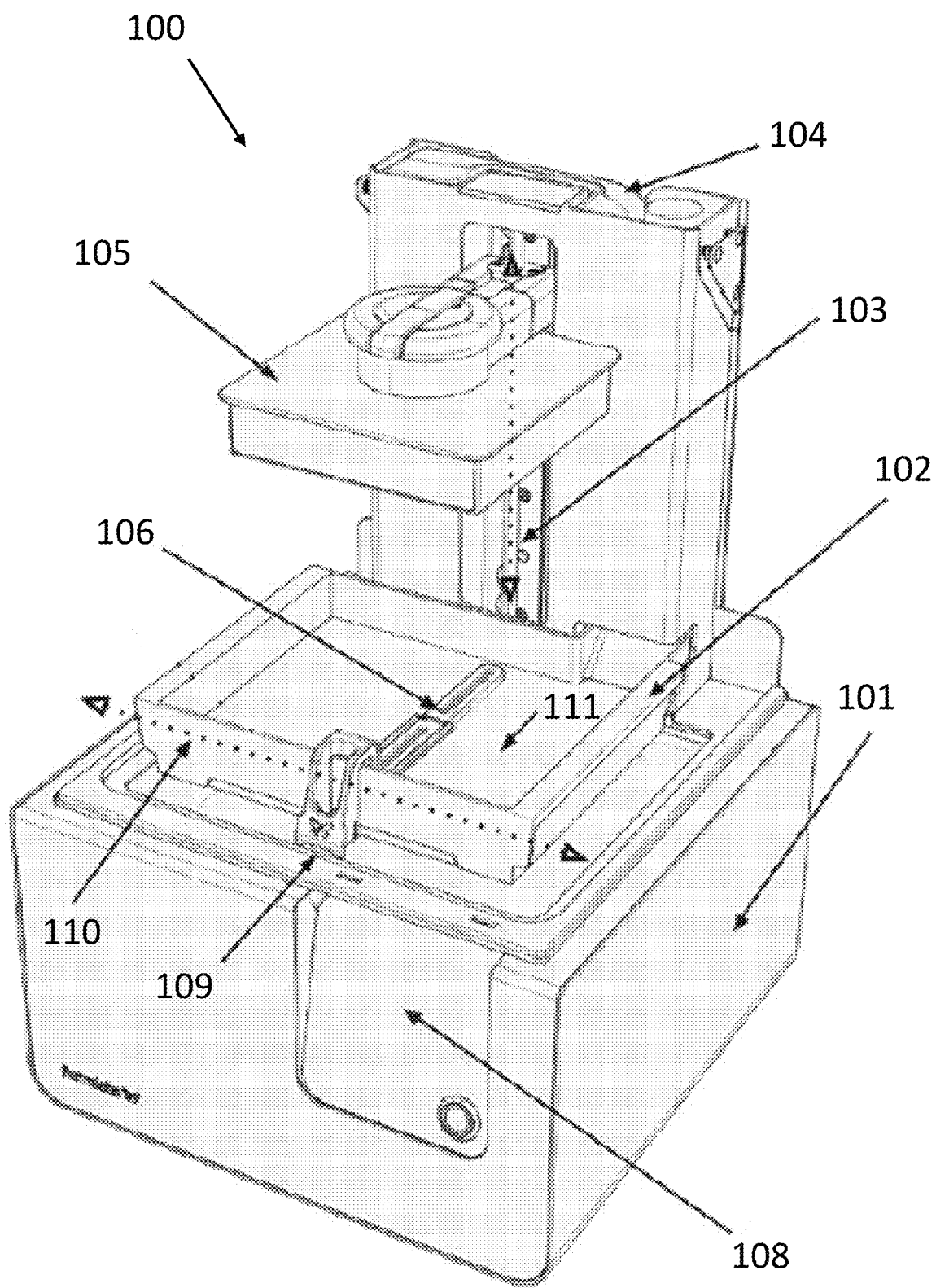
FIGS. 1A-1B depict an illustrative additive fabrication system, according to some embodiments.
Figure 1B:
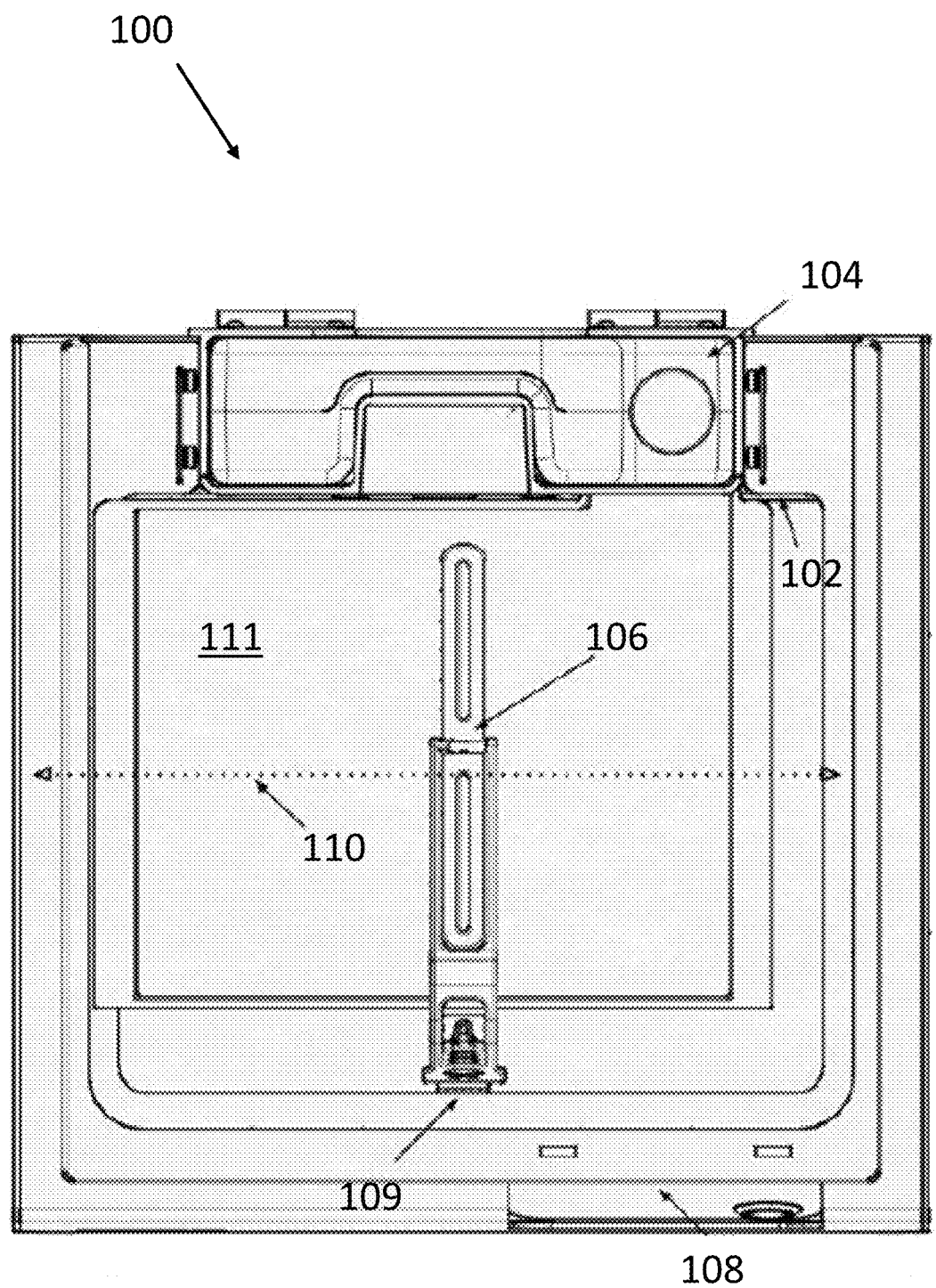

As discussed above, in additive fabrication, a plurality of layers of material may be formed on a build platform. To illustrate one exemplary additive fabrication system, an inverse stereolithographic printer is depicted in FIGS. 1A-B. Illustrative stereolithographic printer 100 comprises a support base 101, a display and control panel 108, and a reservoir and dispensing system 104 for storage and dispensing of a liquid photopolymer (e.g., photopolymer resin). The support base 101 may contain various mechanical, optical, electrical, and electronic components that may be operable to fabricate objects (e.g., articles) using the system.

During operation, liquid photopolymer may be dispensed from the dispensing system 104 into container 102. Build platform 105 may be positioned along a vertical axis 103 (oriented along the z-axis direction as shown in FIGS. 1A-B) such that the bottom facing layer (lowest z-axis position) of an object being fabricated, or the bottom facing layer of build platform 105 itself, is a desired distance along the z-axis from the bottom 111 of container 102. The desired distance may be selected based on a desired thickness of a layer of solid material to be produced on the build platform or onto a previously formed layer of the object being fabricated.

In the example of FIGS. 1A-B, the bottom 111 of container 102 may be transparent to actinic radiation that is generated by a radiation source (not shown) located within the support base 101, such that a curable material, such as the liquid photopolymer resin, located between the bottom 111 of container 102 and the bottom facing portion of build platform 105 or an object being fabricated thereon, may be exposed to the radiation. Upon exposure to such actinic radiation, the curable material may undergo a chemical reaction, sometimes referred to as "curing," that substantially solidifies and attaches the exposed photopolymer to the bottom facing portion of build platform 105 or to an object being fabricated thereon.

FIG. 1A-B represent a configuration of stereolithographic printer 101 prior to formation of any layers of an object on build platform 105, and for clarity also omits any curable material from being shown within the depicted container 102.

Following the photo-curing of a layer of material, a separation process is typically conducted so as to break any bonds (e.g., adhesive bonds) that may have been produced between the cured material and the bottom 111 of container 102. As one example, build platform 105 may be moved along the vertical axis of motion 103 in order to reposition the build platform 105 for the formation of a new layer and/or to impose separation forces upon any bond with the bottom 111 of container 102. In addition, container 102 is mounted onto the support base such that the stereolithographic printer 101 may move the container along horizontal axis of motion 110, the motion thereby advantageously introducing additional separation forces in at least some cases. An optional wiper 106 is additionally provided, capable of motion along the horizontal axis of motion 110 and which may be removably or otherwise mounted onto the support base at 109.

Figure 2A:
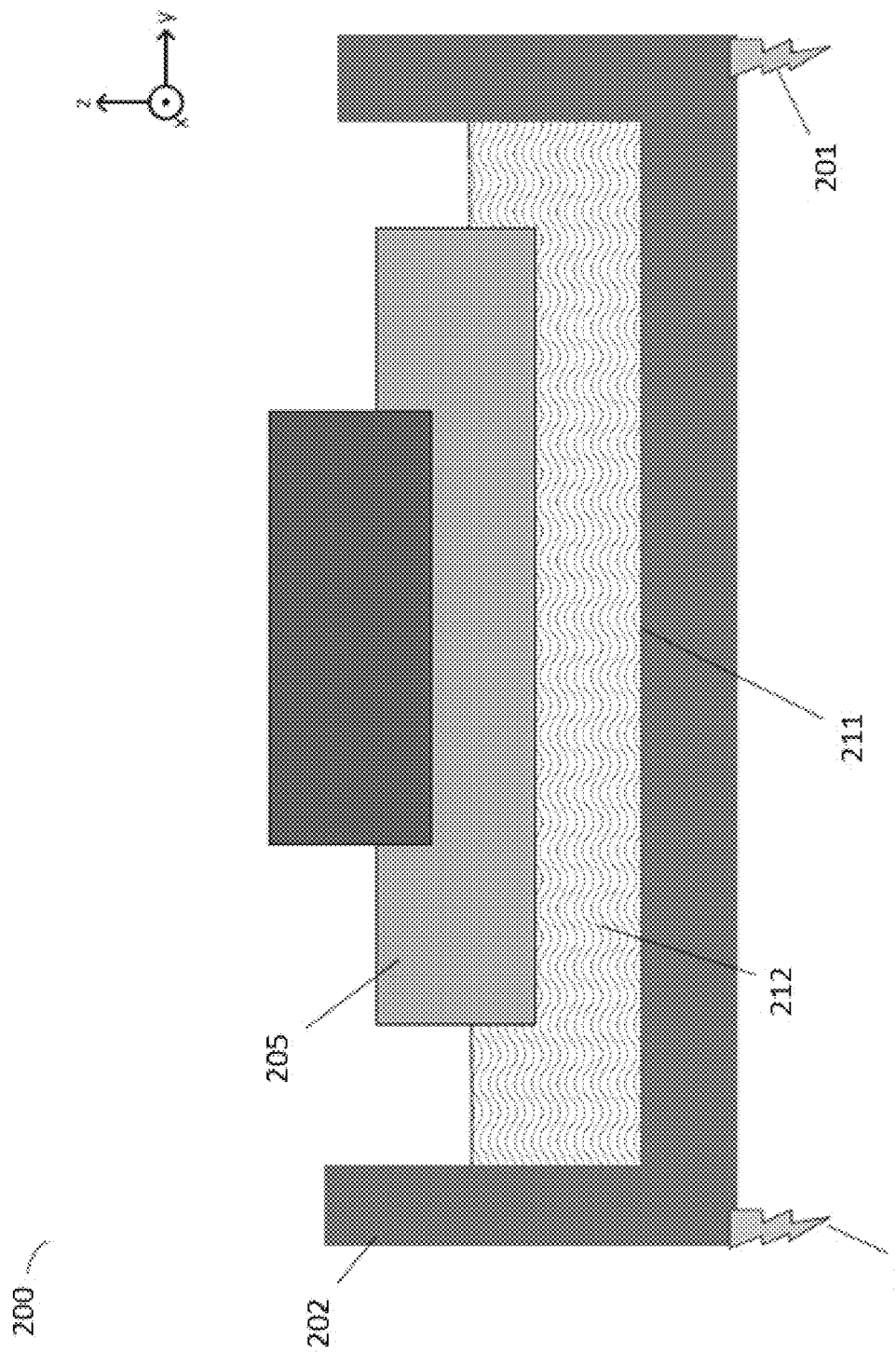
FIGS. 2A-2C depicts an illustrative additive fabrication system, according to some embodiments.
Figure 2B:
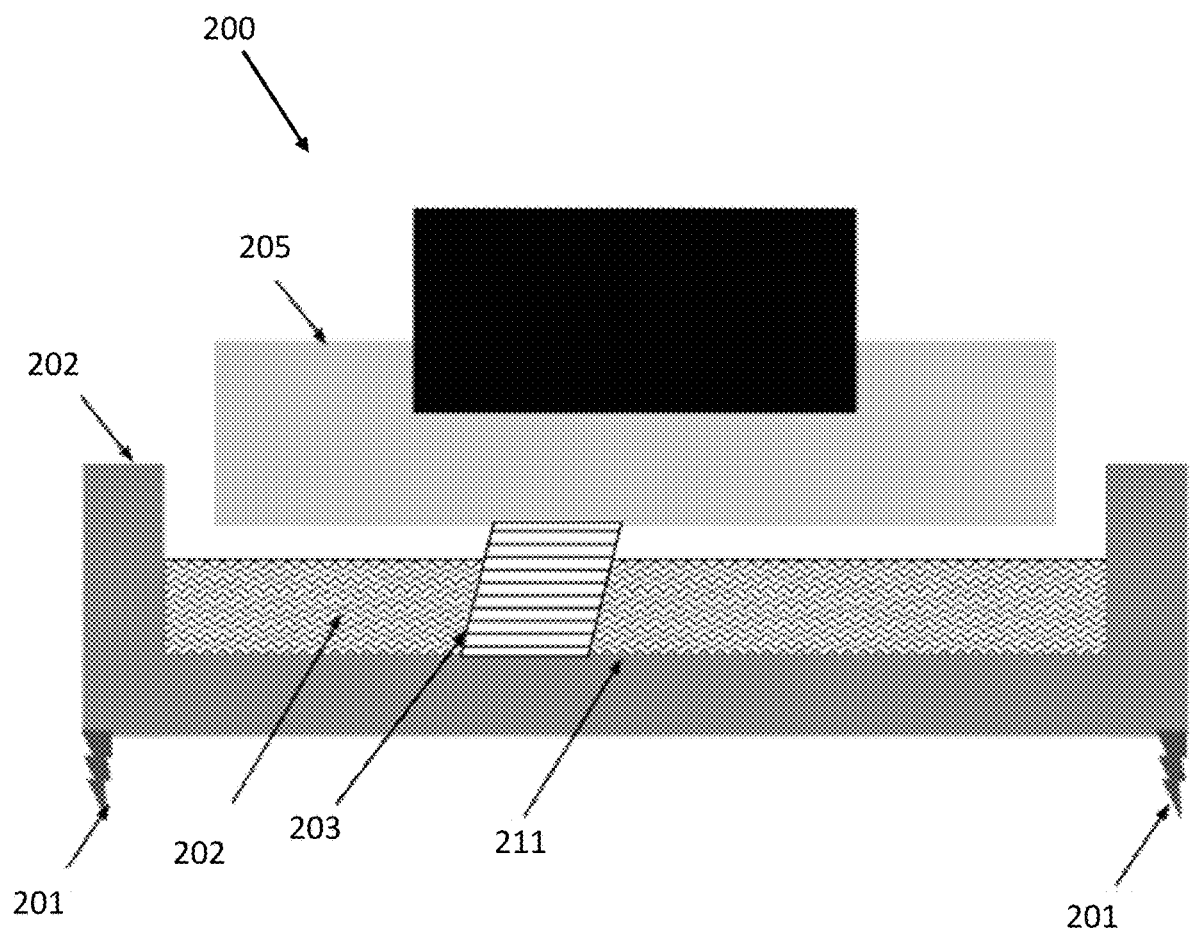

According to one or more embodiments, FIGS. 2A and 2B depict a schematic of an inverse stereolithographic printer 200. In the example of FIGS. 2A-B, stereolithographic printer 200 comprises a build platform 205, a container 202, a leveling mechanism 201, and curable material (e.g., liquid resin) 212. The downward facing build platform 205 opposes the floor of container 211, which contains photopolymer resin 212.

FIG. 2A represents a configuration of stereolithographic printer 200 prior to formation of any layers of a part on build platform 205. Some or all of the photopolymer resin located between the build platform and the bottom of the container may be cured (e.g., by directing actinic radiation through the base of the container onto the resin as described above).

As described above, stereolithographic printers 100 and 200 shown in FIGS. 1A-B and FIGS. 2A-B, respectively, may cure layers of photopolymer resin in contact with both a desired build surface (e.g., the build platform 105 or 205 and/or a previously formed layer of material) and an opposing surface 111 or 211. Such an approach may be employed in systems sometimes known as "inverted" stereolithography machines, where actinic radiation is introduced through an optical window in the bottom of a container.

To illustrate one exemplary additive fabrication technique in which a part is formed in contact with a surface other than another layer or the build platform, an inverse stereolithographic printer is depicted after forming several layers of an object 203 in FIG. 2B.

In some embodiments the curable material (e.g., liquid resin) could comprise a combination of oligomers, monomers, and photoinitiators. In some cases, the curable material could optionally include pigments, dyes, and other specialty additives as well. In addition the mixture could include fillers such as silica, glass, ceramic, metallic, or other particles or additive to achieve desired mechanical properties.

In some embodiments, the curable material may be dispensed from the dispensing system 104 into the container 102. With everything in place as discussed above with printer 100 or 200, the source of actinic radiation can be used to expose the curable material. The actinic radiation would generally cause any photoinitiators present in the liquid resin to form photo-reactive species. These photo-reactive species may, in some cases, then react with monomeric or polymeric components and initiate a cross-linking or further polymerization reaction. This polymerization generally causes the layer to cure in the cross section exposed to actinic radiation.

This cross section adheres to either the build platform 205 or to the previous layer of the object. The object formed would be made of a polymeric material. The type and properties of the material would depend on the monomeric, oligomeric, and/or polymeric components as the base of the resin. The above embodiment describes a standard photocurable polymer; as may be understood, the use of additional additives or components such as fillers may further impact the properties of the material.

Figure 2C:
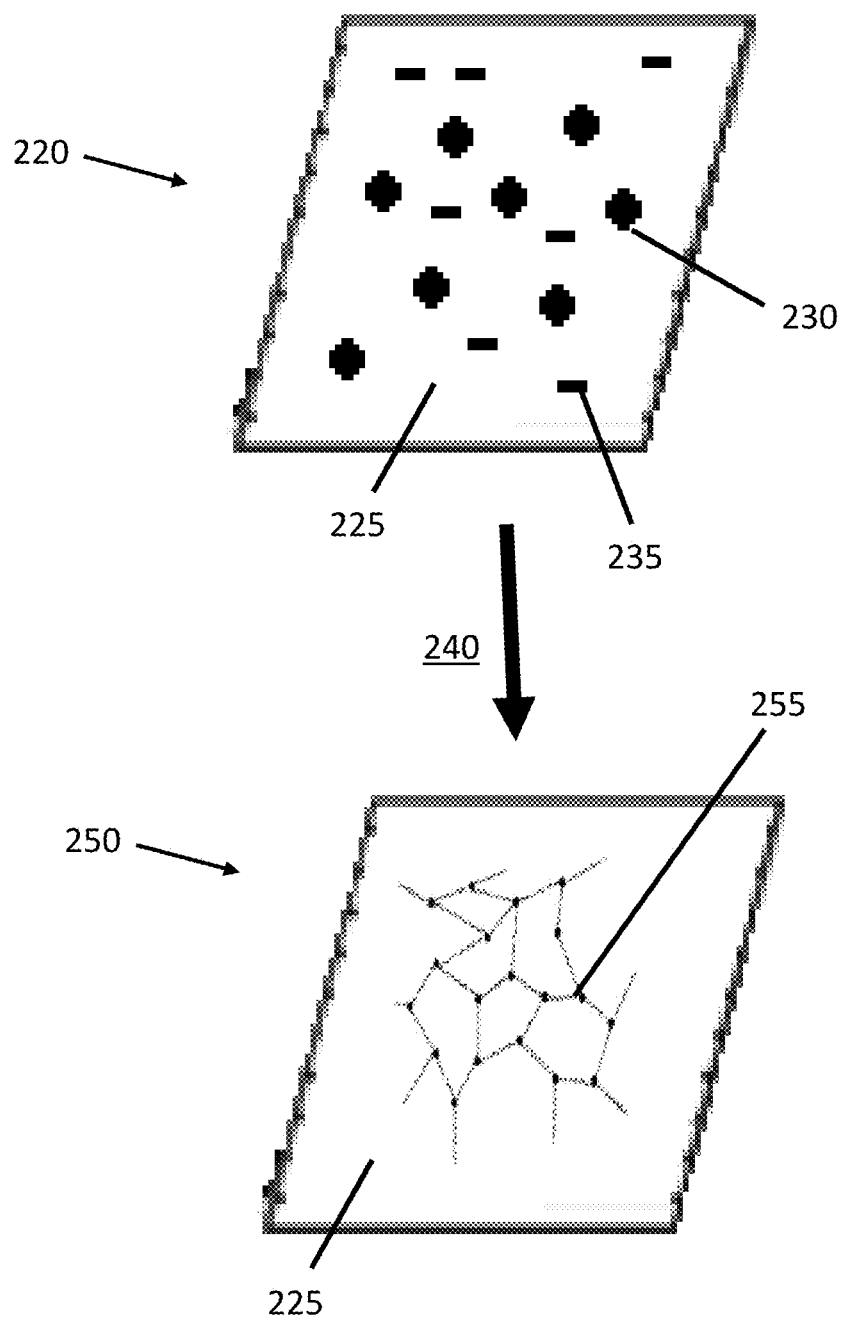

FIG. 2C shows an object 220 in a green state, according to one or more embodiments. The object 220 may be formed by the process of forming successive photo-cured layers 203, as discussed above with regard to FIG. 2B. The object 220 in the green state may comprise the intermediate polymeric structure 225, as well as a first precursor species 230 and a second precursor species 235 of a secondary precursor component that has not yet undergone substantial secondary polymerization, i.e., is in a latent state. In the green state, object 220 has some defined structure given by the intermediate polymeric structure 225, but has not yet been fully cured to provide an object in its final state. The secondary component may be subjected to an initiating event 240 (e.g., exposure to moisture) which causes a secondary polymerization process to occur to produce article 250. In some embodiments, the final article comprises both a photocured polymer species or intermediate polymeric structure 225, as well as the secondary polymer species or polymeric network 255. Mechanisms related to secondary curing are discussed further, herein.

Latent cure resins for use in additive manufacturing are generally described herein. As used herein, the term "latent-cure resin" refers to a resin having at least two separate curing steps that may occur simultaneously or sequentially. For example, according to some embodiments of the invention, a curable material may be a latent cure resin comprising a first or primary component configured to cure (e.g., when subjected to actinic radiation) and at least a second or secondary component in which curing is initialized through a separate event or condition such as ambient moisture or the introduction of a gaseous species. Other mechanisms for initializing curing are also possible, as discussed herein.

In certain embodiments, the curable material comprises a first precursor component and a second precursor component, different than the first precursor component. Each precursor component (e.g., the first precursor component, the second precursor component) may comprise one or more oligomers, monomers, and/or photoinitiators. In some cases, the curable material and/or one or more precursor components could optionally include pigments, dyes, and other specialty additives as well. In addition the mixture could include fillers in one or more precursor components such as silica, glass, ceramic, metallic, or other particles or additive to achieve desired mechanical properties.

Advantageously, incorporating a secondary polymerization mechanism may enable many more polymeric chemistries accessible to additive manufacturing leading to e.g., outstanding and diverse mechanical properties that would be difficult or impossible to achieve in a single-cure resin. According to one or more embodiments, the primary or initial cure step would comprise e.g., traditional additive manufacturing techniques to create a scaffolding or green article. That is to say, in some embodiments, the first precursor component may be at least partially cured (e.g., by exposure to actinic radiation), thereby producing an intermediate polymeric structure, where a secondary precursor component is suspended in the intermediate polymer structure.

Once the initial reaction constructs the desired object, a secondary reaction may take place (e.g., curing of the second precursor component) and the desired properties, such as increased strength, may be attained. Advantageously, in some embodiments, a two-step cure may allow for time to adjust the shape or placement of the material while it is in a moldable and/or gel-like form before subjecting the article to the secondary cure mechanism that would more completely harden the material. The object formed from the primary cure step may be referred to as a green article, or in a green state.

Figure 3:
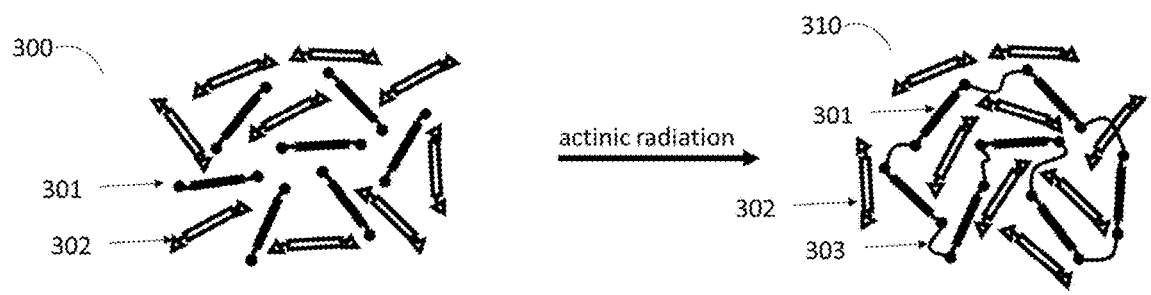
FIG. 3 illustrates an exemplary embodiment of the internal structure of the part formed using the stereolithographic printer both before and after additional post processing steps to trigger the latent cure mechanism, according to some embodiments.
Figure 3:
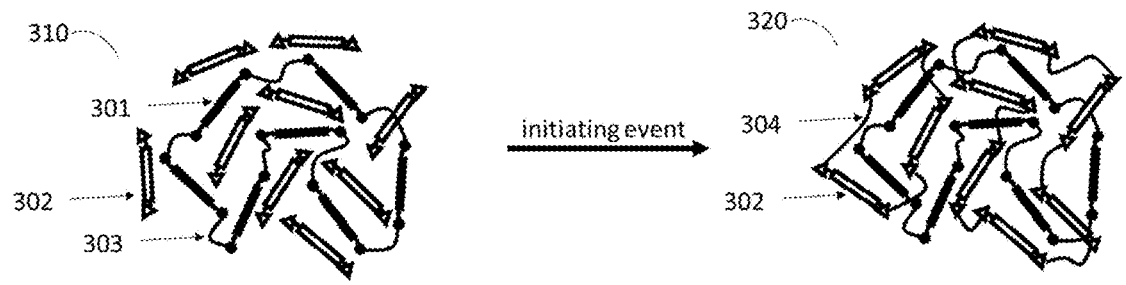

FIG. 3 shows an exemplary curable material 300 with primary component 301 and secondary component 302. The photopolymer mixture may contain numerous other additives not pictured here to achieve certain properties or aid in the photopolymerization or curing process. It may also be advantageous, in some cases, to include further additives such as pigments or dyes, fillers such as silica, glass, ceramic, metallic, or other particles or additive to e.g., achieve desired mechanical properties.

During the printing process as depicted in FIGS. 2A and 2B, the source of actinic radiation may expose the curable material 300 causing the primary component 301 to at least partially polymerize and cure into a primary polymeric network 303. The curing of the primary components generally creates an intermediate polymeric structure with suspended secondary components, or green state structure 310. The object may be formed by the process of forming successive photo-cured layers 203, as discussed above with regard to FIG. 2, with each layer having a green state structure 310 at the time of formation. The object in the green state 310 may comprise the primary component 301, as well as a secondary component 302 that has not yet undergone substantial secondary polymerization, i.e., is in a latent state.

In the green state, the object may have some defined structure given by the primary cured components 301 and 303, but has not yet been fully cured to provide an object 320 in its final state. The secondary component may be subjected to an initiating event (e.g., exposure to moisture or other chain extenders such as gaseous chain extenders). In some such embodiments, the initiating event may be ambient conditions such as ambient moisture or humidity, which causes a secondary polymerization process (e.g., at least partial curing of the second precursor component) to occur to produce object 320. The final article comprises both the primary polymeric network 303, as well as the secondary polymeric network 304. In some embodiments, the final article comprises an interpenetrating polymer network. Mechanisms related to secondary curing are discussed further, herein.

Embodiments presently disclosed fulfill a need in the industry for new polymeric materials with enhanced ranges of material properties. Some embodiments disclosed herein accomplish these goals by using a mixture of two polymeric precursor component such that the initial photoreactive cure step is able to form a "green" structure or scaffold in the desired shape that can then undergo the secondary latent cure process to finalize the mechanical properties of the material, according to some embodiments. With such a latent-curing second step it is generally important to keep the secondary cure components from reacting too early and interfering with the initial green structure creation. Additionally, the green structure generally has, in some embodiments, sufficient mechanical properties such that it is not affected by the printing process or post-processing steps.

The latent-cure resin may comprise a primary precursor component for forming a first polymer and a secondary precursor component, different than the primary precursor component, for forming a second polymer. Each of the precursor components may comprise one or more precursor species that cure, or react to form a form polymers (e.g., (meth)acrylate to poly(meth)acrylate, isocyanate to polyurea), upon the initiation of certain conditions.

In some embodiments, the curable material comprises a primary precursor component comprising a photo-curable component configured to cure when subjected to an effective amount of actinic radiation. In certain embodiments, the cured (primary) polymeric material may be a type of (meth)acrylate or acrylate polymer. (Meth)acrylates may be useful in 3D printing applications because the monomers and oligomers are generally stable in ambient condition. The photo-curable component may further comprise a photoinitiator. With the addition of a photoinitiator and the relevant light source (e.g., actinic radiation), the materials may become highly reactive through radical photopolymerization, and cure to form a polymer. The article formed at this stage may be referred to as a "green" article, indicative of the fact that further curing and strengthening may take place. As described herein, the "green" article may comprise an intermediate polymeric structure with a secondary prepolymer component suspended in such intermediate polymer structure.

As may be appreciated, the material properties of the end object may be dependent on a variety of factors. Some such factors may include, primary cure component mixture, secondary component mixture, the ratio between the two or more components, as well as post processing steps. The primary component may be based on a polymeric (meth) acrylate with many components including one or more monomeric or oligomeric (meth)acrylates. Using a mixture of methacrylate monomers of oligomers may impart a variety of material properties to the green structure. For example, without wishing to be bound by theory, some monofunctional acrylates may preserve the % elongation (at break) by reducing the crosslinking ratio, difunctional acrylates may serve to react more quickly and provide a higher rigidity that may be useful to ensure adequate green strength. Further monomers or oligomers may be added as stabilizers to improve the compatibility between the primary and secondary components.

In some cases, the first precursor component may comprise one or more of a monofunctional acrylic monomer, a difunctional acrylic monomer, and/or a photoinitiator. In an exemplary embodiment, the first precursor component comprises a monofunctional acrylic monomer, a difunctional acrylic monomer, a difunctional urethane-acrylate monomer, and/or a photoinitiator. In another exemplary embodiment, the first precursor component comprises a monofunctional acrylic monomer, a a difunctional urethane-acrylate monomer, and a photoinitiator.

Non-limiting examples of suitable monofunctional acrylic monomers include lauryl acrylate and methoxy polyethylene glycol monoacrylate. Other monofunctional acrylic monomers are also possible, including, for example, dicyclopentadienyl (meth)acrylate, diethylene glycol methyl ether (meth)acrylate, alkoxylated lauryl meth(acrylate), tetrahydrofurfuryl (meth)acrylate, cycloaliphatic (meth)acrylates, stearyl (meth)acrylate, 2-phenoxyethyl (meth)acrylate, isobornyl (meth)acrylate, tridecyl (meth)acrylate, ethoxylated nonyl phenol (meth)acrylate, cyclic trimethylolpropane formal (meth)acrylate.

Non-limiting examples of suitable difunctional acrylic monomers include polyethylene glycol diacrylate and neopentylglycol propoxylated diacrylate. Other di- and multifunctional monomers are also possible including, for example, ethoxylated bisphenol A di(meth)acrylate, alkoxylated hexanediol di(meth)acrylate, alkoxylated neopentyl glycol di(meth)acrylate), triethylene glycol di(meth)acrylate, 1,4-butanediol di(meth)acrylate, tripropylene glycol di(meth)acrylate, polypropylene glycol di(meth)acrylate, tricyclodecane dimethanol di(meth)acrylate. In some cases, the first precursor component comprises a difunctional urethane-acrylate monomer.

Non-limiting examples of photoinitiators include (ethyl (2,4,6-trimethylbenzoyl)-phenyl phosphinate, diphenyl (2,4,6-trimethylbenzoyl)-phosphine oxide, phenyl bis(2,4,6-trimethylbenzoyl)-phosphine oxide, 1-hydroxy-cyclohexyl-phenyl-ketone, benzyl dimethyl ketal, 4-chloro benzophenone, 2-ethyl anthraquinone, methyl benzoyl formate.

The curable material may further comprise a secondary precursor component configured to cure, or react to form a secondary polymer, upon the initiation of certain conditions. In some cases, it may be advantageous to initiate the secondary component through the conscious addition of a stimulus. In certain embodiments, the secondary component could cure latently, polymerizing under ambient moisture conditions and/or with other environmental modifications such as heat and/or the addition of a gaseous species (e.g., catalysts such as ammonia). As may be appreciated based upon the teachings of this specification, a secondary component polymerized in ambient moisture conditions may polymerize contemporaneously with the primary photocurable component. It may therefore be advantageous, in some embodiments, to control this cure step by either carefully controlling atmospheric conditions throughout the printing process and post processing, or tailoring the composition of the material such that the secondary cure proceeds at a rate that is useful for printing.

While much of the description herein relates to a curable material comprising a primary precursor component and a secondary precursor component, additional precursor components (e.g., a third precursor component, a fourth precursor component, etc.) may also be present in the curable material. In some embodiments, each precursor component may be different and/or may be configured to at least partially cure under different conditions (e.g., wavelength and/or intensity of actinic radiation, exposure to moisture, exposure to a chain extender, exposure to a gas).

In some embodiments, it may be advantageous to physically isolate the secondary precursor components to prevent unwanted cure. Physical isolation of secondary precursor components is described in more detail in, for example, U.S. patent application Ser. No. 15/583,083 filed May 1, 2017 and entitled "Dual-Cure Resins and Related Methods", which is incorporated herein by reference in its entirety for all purposes.

In some embodiments, as described herein, it may be advantageous to have the components (e.g., the first precursor component, the second precursor component) freely intermixed. For example, in certain embodiments, a kit may be provided, the kit comprises a first precursor component and at least a second precursor component, different than the first precursor component, configured to be dispensed in additive fabrication (e.g., 3-dimensional printing) device. In some cases, the kit comprises a curable material comprises a mixture of the first precursor component and the second precursor component.

The precursors for materials such as polyureas may react readily in the presence of moisture or heat. In some cases, moisture may act as a chain extender to facilitate the polymer reaction. Heat may, in some embodiments, be used to improve the thermodynamic energy to allow the reaction to proceed (e.g., proceed more rapidly as compared to rates at cooler temperatures) between isocyanates.

According to some embodiments, the second precursor component may be selected to form a desired secondary polymer. For example, in some cases, the second precursor component may comprise one or more monomers, oligomers, and/or polymers to form a desired secondary polymer (e.g., a polyurea, a polyurethane). The secondary polymer may be a thermoset plastic polymer. Other secondary polymers are also possible.

Advantageously, as described herein, the use of secondary polymers in addition to the primary polymer (e.g., (meth)acrylate) can facilitate an expansion of available material properties. For example, polyureas generally tend to have more desirable material properties, heat response, and resistance to aging. Additionally, in some cases, polyureas may be relatively stronger with a relatively higher elongation making the resulting material tougher and better able to withstand repeated use. The following discussion relates to polyureas, but can be applied to any number of polymer groups as one skilled in the art would understand based upon the teachings of this specification.

In some embodiments, the secondary precursor component may be configured to form a polyurea upon curing. In certain embodiments, the secondary precursor component may comprise an isocyanate terminated prepolymer.

Figure 4:
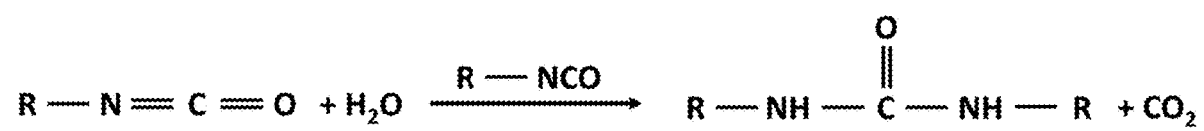
FIG. 4 depicts a schematic of polyurea formation, according to some embodiments.

In conventional polyurea synthesis, a two-step approach is typically used. For example, first, a small molecule diisocyanate monomer is reacted in excess with a large difunctional amine. Second, an amine-based chain extender is added to form the complete polymer. An example of a conventional polyurea synthesis is shown in FIG. 4. In the embodiment depicted in FIG. 4, an isocyanate molecule reacts with water to produce an amine and carbon dioxide. These amines may react with other isocyanates to produce a urea species. As the chain continues to react, the polyurea may be formed. In some embodiments, an optional amine accelerator or catalyst may also be incorporated to improve the reaction speed. As may be understood, this reaction could be substituted with any isocyanate terminated molecules. This may include for example aliphatic isocyanates, aromatic isocyanates, or the like.

The secondary precursor components may comprise any suitable number of isocyanate terminated prepolymers. Isocyanate prepolymers are generally synthesized by the reaction of isocyanates and polyols. Aromatic and/or aliphatic isocyanates may be employed to produce prepolymers. Polyurethanes and polyureas come in many different forms and can achieve a diverse range of material properties varying from high rigidity to high flexibility. By way of example, aromatic isocyanates may be used to create more rigid materials, aliphatic isocyanates may be used to create softer materials that are more resistant to UV.

As described herein, the (secondary) precursor component may comprise oligomers and/or comprise other polymeric or monomeric building blocks that are isocyanate terminated. The composition of the precursor component used may determine the material properties of the resulting polymer. It may be advantageous, in some embodiments, to use different isocyanate terminated prepolymers to achieve desired material properties. These prepolymers could contain a variety of different internal polymeric chains. For example, the internal polymer could contain polyurethanes, polyesters, polyethers, or any number of polymer building blocks. Some exemplary isocyanate terminated polyesters may provide a desirable tensile strength to the material. Some exemplary isocyanate terminated polyethers may provide materials that remain flexible at lower temperatures with advantageous glass transition temperatures.

As would be understood by one skilled in the art, based upon the teachings of this specification, the secondary precursor component may comprise any suitable isocyanate terminated polymeric building block(s) and/or polyol building block(s). Non-limiting examples of suitable aromatic isocyanates include toluene diisocyanate, diphenylmethane diisocyanate, xylene diisocyanate, p-phenylene diisocyanate, naphthalene 1,5-diisocyanate, and 4,4'-dibenzyl diisocyanate. Non-limiting examples of suitable aliphatic isocyanates include 1,6-hexamethylene diisocyanate, isophorone diisocyanate, 4,4'-dicylcohexylmethane diisocyanate, hydrogenated xylene diisocyanate, 2,2,4-trimethylhexamethylene diisocyanate, and meta-tetramethylxylylene diisocyanate. Non-limiting examples of suitable polyol compounds include polyester polyols, polycarbonate polyols and polyether polyols. By way of example, some polyether polyols that may be useful include polypropylene glycol, polyethylene glycol, or polytetramethylene ether glycol.

As would be known to one skilled in the art, different combinations of isocyanate terminated polymeric building blocks may impart different characteristics on the end material. Different polymeric combinations may result in different ratios of isocyanate content which may be indicative of the potential end properties of the resulting material. Relatively low isocyanate content may result in a more elastic end material while higher isocynate contents may react more quickly and result in a more rigid material. As may be known, if the isocynate percentage is too low, the polymeric building blocks may tend to be solid at room temperature which may result in unfavorable printing conditions. This may be remedied by increasing the heat added or by favoring secondary components with increased isocynate percentages. It may be advantageous to use a polymeric building block where the icocynate percentage is at least 2%.

The secondary cure component may proceed by adding an additive e.g., to serve as a chain extender. In some embodiments, the chain extender will serve to react with the isocyanate to form the intermediate structure, for example the amine of FIG. 4. In certain embodiments, the chain extender may comprise water (e.g., moisture, humidity). For example, in FIG. 4, water serves as the chain extender. Other alternative chain extenders may also be used. Some non-limiting examples of chain extenders include hydrazine, ethylene diamine, ethylene glycol, diethylene glycol, 1,3-propanediol, neopentyl glycol, ethanolamine, and the like. In certain embodiments, the chain extender may be in gaseous form. For example, in some embodiments, the intermediate polymeric structure may be exposed to a gas comprising a chain extender.

Pot life is generally the term of usability for a mixture typically determined under ambient conditions. Additive manufacturing techniques may require, in some cases, a long pot life such that a mixture is usable for the duration of the print. Print times may range from very short times of just a few minutes to multiple hours or even days. In some embodiments, it may be advantageous to adjust the ambient printing conditions to limit the existing moisture and thereby improve the pot life of the curable material (e.g., the latent-cure resin). For example, in some embodiments, the curable material may be maintained at a humidity of less than or equal to 50%, less than or equal to 40%, less than or equal to 30%, less than or equal to 20%, less than or equal to 10%, less than or equal to 5%, or less than or equal to 1% prior to curing of the secondary precursor component. In some cases, the curable material may be maintained at a relatively high humidity. For example, in certain embodiments, the curable material may be maintained at a humidity of greater than or equal to 50%, greater than or equal to 60%, greater than or equal to 70%, greater than or equal to 80%, or greater than or equal to 90%.

The (de)humidification may be accomplished in a variety of manners such as using a dehumidifier in the area of the printing method. In some embodiments the dehumidifier may be placed in the printing enclosure itself. In some embodiments it may be advantageous to have multiple printers 100 in one enclosure that contains a dehumidifier.

As may be appreciated, any method of dehumidifying may be employed including thermal condensation dehumidification, absorption or desiccant dehumidification, ionic membrane dehumidification. Mechanical/refigerative dehumidication systems may have additional benefits where multiple 3D printers are in a single enclosure because the dried air is returned at an increased temperature. Desiccant dehumidification could use any number of moisture absorbing materials such as molecular sieves or zeolite. Moisture scavengers that react with water such as oxazolidines, benzoyl chloride, and phenyl isocyanate may also be employed. It may further be advantageous to use dry air environments by introducing inert gases such as nitrogen or argon into the printer enclosure.

Shelf life is generally the term of usability for a mixture typically determined from manufacture until final use, and under a variety of conditions and temperatures that could be expected during shipping and storage, as well as ambient conditions in the printer itself. It may be advantageous to extend the shelf life of a resin to a sufficient length of time, so as to allow the resin to be pre-mixed at a manufacturing stage, rather than mixed by a user post-purchase. It may be advantageous to have a shelf life of greater than or equal to one month, greater than or equal to three months, greater than or equal to a year, greater than or equal to 15 months, or longer.

In some cases, improved pot and shelf life of the resin may be facilitated by ensuring the production, packaging, and transportation of the curable material (e.g., latent-cure resin) is properly protected from moisture. This may include, for example, incorporating additional dehumidification efforts as outlined above as well as packaging in smaller volume or with other specialized containers suitable to limit the materials interaction with moisture until such time as is desirable for the secondary cure step.

Premature gelation or viscosity increases in the liquid resin due to the secondary cure may reduce pot/shelf life. As portions of the secondary component react, the viscosity increases, in turn impacting various mechanisms of the additive manufacturing process such as separation of the object from the container and material mobility for printing subsequent layers, and reducing the term of usability of the resin.

According to one or more embodiments, the curable material e.g., comprising a first precursor component and a second precursor component may have a viscosity of from about 1 cP to about 20,000 cP, or of from about 1,000 cP to about 6,000 cP, when measured at a temperature 30° C. Other values are also possible.

In some embodiments, the primary (e.g., photocurable) precursor component and the secondary precursor component are present in the curable material at certain ratios by weight. For example, in some embodiments, the ratio by weight of primary precursor component (e.g., comprising one or more photocurable monomers, oligomers, and/or polymers) to secondary precursor component (e.g., comprising one or more monomers, oligomers, and/or polymers curable upon exposure to a secondary cure mechanism) is from about 5:95 to about 95:5, or from about 10:90 to about 90:10, or from about 15:85 to about 85:15, or from about 30:70 to about 70:30, or from about 35:65 to about 65:35, or from about 40:60 to about 60:40, or at about 50:50. Other ranges are also possible. In some embodiments, the ratios of first component to second component may be selected e.g., to balance the desire for high secondary polymer content to the desire for a high strength in the "green" state (i.e. prior to curing the secondary precursor component). Additionally, and without wishing to be bound by theory, by diluting the volume of the secondary cure component, higher primary polymer content may further reduce the speed of the secondary cure rate in order to provide a longer pot life. Each of these ratios may, in some cases, be useful to provide a wide variety of material properties in the end product. Each of these ratios may, in some cases, further depend on the strength and properties of the primary component.

By way of example, in some cases, the ratio of the weight of the primary cure component versus the secondary cure component in the curable material may be selected such that the final object (e.g., after curing of the primary cure component and the subsequent curing of the secondary cure component) has a relatively high elongation at break. In another exemplary embodiment, the ratio of the weight of the primary cure component versus the secondary cure component in the curable material may be selected such that the final object has a relatively high Shore A hardness and a relative high tensile strength. In yet another exemplary embodiment, the ratio of the weight of the primary cure component versus the secondary cure component in the curable material may be selected such that the final object has a relatively high elongation at break and a relatively high tensile strength. In a further exemplary embodiment, the ratio of the weight of the primary cure component versus the secondary cure component in the curable material may be selected such that the final object has a relatively low elongation at break. Without wishing to be bound by theory, in some cases, a higher ratio of secondary precursor component to primary precursor component in the curable material may lead to an object having a relatively high elongation at break. Without still wishing to be bound by theory, in some cases, a higher ratio of primary precursor component to secondary precursor component in the curable material may lead to a relatively soft material.

In some embodiments, the first precursor component and at least the second precursor component may be selected such that the object (i.e. the formed article) may have an elongation at break of greater than or equal to 125%, greater than or equal to 140%, greater than or equal to 160%, greater than or equal to 180%, greater than or equal to 200%, greater than or equal to 225%, greater than or equal to 250%, greater than or equal to 275%, greater than or equal to 300%, greater than or equal to 350%, greater than or equal to 400%, greater than or equal to 450%, or greater than or equal to 500%. In certain embodiments, the object may have an elongation at break of less than or equal to 600%, less than or equal to 500%, less than or equal to 450%, less than or equal to 400%, less than or equal to 350%, less than or equal to 300%, less than or equal to 275%, less than or equal to 250%, less than or equal to 225%, less than or equal to 200%, less than or equal to 180%, less than or equal to 160%, or less than or equal to 140%. Combinations of the above-referenced ranges (e.g., greater than or equal to 125% and less than or equal to 600%) are also possible. Other ranges are also possible.

In certain embodiments, the first precursor component and at least the second precursor component may be selected such that the object has a Shore A hardness of greater than or equal to 50, greater than or equal to 60, greater than or equal to 70, greater than or equal to 80, or greater than or equal to 90. In certain embodiments, the object may have a Shore A hardness of less than or equal to 100, less than or equal to 90, less than or equal to 80, less than or equal to 70, or less than or equal to 60. Combinations of the above-referenced ranges (e.g., greater than or equal to 50 and less than or equal to 100) are also possible. Other ranges are also possible.

In some cases, the first precursor component and at least the second precursor component may be selected such that the object has a tensile strength of greater than or equal to 5 MPa, greater than or equal to 10 MPa, greater than or equal to 15 MPa, greater than or equal to 20 MPa, or greater than or equal to 25 MPa. In certain embodiments, the object may have a tensile strength of less than or equal to 30 MPa, less than or equal to 25 MPa, less than or equal to 20 MPa, or less than or equal to 15 MPa. Combinations of the above-referenced ranges (e.g., greater than or equal to 10 and less than or equal to 30) are also possible. Other ranges are also possible.

The ideal ratio of primary cure components to secondary cure components may also depend on a variety of factors including forces the model may be subjected to during the printing process, desired end properties of the material, geometry of the form, required pot life of the liquid material, strength of the primary component, expected speed of the secondary component cure reaction, as well as other relevant factors.

The print process may subject the object being formed to a variety of stresses and forces. Including the forces applied during peel cycles. Stronger forces may be compensated for with use of stronger primary polymer components. Additionally larger, more solid geometries may be subjected to larger forces and require a higher green strength (e.g., the tensile strength and/or hardness of the intermediate polymeric material) than smaller models or lattice structures. Larger structures may also require lower quantities of secondary component to ensure the secondary cure is able to proceed fully and without foaming from the release of gasses during the reaction.

In order to achieve the desirable material characteristics of the secondary components, it may be desirable to use the minimum primary components to withstand the print process and produce the desired green strength.

Adjusting the ratio between the primary and secondary components may be advantageous to achieve the desired pot life. Larger ratios of the primary components may dilute the secondary components and further extend the pot life by slowing down the latent cure process. This relationship is generally based on standard thermodynamic principles.

Cure rate of the second precursor component may be further adjusted by, for example, the addition of one or more catalyst components to the curable material and/or intermediate polymeric component to further promote the secondary cure reaction. Non-limiting examples of suitable catalysts that may be able to promote such a secondary reaction, by way of example some commercially available amine catalysts may include 2,2-dimorpholinodiethylether, bis(2-dimethylaminoethyl)ether, N,N-dimethylethanolamine, and N,N,N'-trimethyl-N'-hydroxyethyl-bisaminoethylether.

Metallic catalysts such as dibutyltindilaurate and stannous octoate may also be used. Advantageously, by the employment of a catalyst, post cure rate may in some cases be increased, resulting in significantly shortened post processing time to obtain the final material properties.

The compositions and resins described above may be incorporated into methods for additively manufacturing articles.

Methods may comprise providing a curable material comprising a primary (photo-curable) component and a secondary component, according to one or more embodiments of the invention described above.

Methods may further comprise subjecting the photo-curable component to actinic radiation to produce a photo-cured polymer. The step of subjecting the photo-curable component to actinic radiation to produce the photo-cured polymer may comprise forming successive layers of the photo-cured polymer to produce a green article comprising the secondary component.

Methods may further comprise subjecting the secondary component to an environment suitable for reaction to allow the secondary precursor species to undergo the secondary cure. The secondary cure may result in a secondary polymer, such as a polyurea, polyurethane, as described herein. In some embodiments, the initiating event may occur while the article is a green article (i.e., after the photo-curing step). In some further embodiments the latent-cure may progress simultaneously with the initial photo-curable component.

In an exemplary embodiment, the first precursor component comprises an acrylic or derivatives thereof and the second precursor component comprises an isocyanate or derivatives thereof. In some cases, the second precursor component may further comprise a pigment, a dye, an additive, and/or a filler. In certain embodiments, curing the first precursor component comprises exposing the first precursor component to an effective amount of actinic radiation. In certain embodiments, curing the second precursor component comprises exposing the article to humidity, heat, and/or an effective amount of actinic radiation. In some such embodiments, the effective amount of actinic radiation for curing the second precursor component is different than the effective amount of actinic radiation for curing the first precursor component. For example, the effective amount of actinic radiation for curing the second precursor component may differ in wavelength, intensity, and/or exposure time than the effective amount of actinic radiation for curing the first precursor component.

While it may be appreciated that the secondary cure could proceed in ambient conditions with the moisture and the temperature available in standard conditions, it may be advantageous to better control and further expedite the secondary reaction. The reaction of isocyanates with water to produce polyurea may be substantially exothermic and may tend to produce foams with the release of carbon dioxide if the reaction proceeds too quickly. Foaming and bubbles may reduce the desirable material properties of polyurethanes. It may be advantageous to control the secondary cure environment by limiting the moisture available. The desirable environment may further depend on the geometry of the part with thin lattices being able to cure with a lower moisture level than larger or thicker parts.

As may be appreciated, the temperature of the environment may further impact the secondary cure rate. Isocyanates may react more readily and the thermodynamic relationship may be more advantageous at elevated temperatures.

As may be appreciated, the isocyanate+chain extender reaction proceeds quite readily. It may therefore be advantageous to limit the introduction of chain extender such that the reaction proceeds at a reasonable pace to allow for the resulting gas byproduct to diffuse out of the system. In some embodiments it may be advantageous to use a gas chain extender in order to control the speed of the reaction. With water this may be achieved by using a controlled humidity chamber or ambient moisture. For other chain extenders it may be advantageous to introduce the extender and the green state structure into a high pressure or high temperature system to ensure the chain extender is gaseous.

Based on the above, it may be advantageous to conduct the secondary cure step in a chamber with controlled moisture content and temperature. In some embodiments the moisture would be introduced with air at a given percent humidity ranging from 1% to 100% with the optimal range depending on many factors including the ratio of primary to secondary cure components, the geometry of the object, and the temperature at which the reaction is taking place. For particularly thick geometries it may be advantageous to use a lower humidity percentage to ensure the reaction proceeds very slowly. For some thin structures or lattices it may be advantageous to use a high humidity percentage to reduce the time required from green state structure to final object.

In some embodiments, the secondary precursor component (e.g., suspended in the intermediate polymeric structure) is cured by exposing the intermediate polymeric structure to air having a humidity of greater than or equal to 1%, greater than or equal to 2%, greater than or equal to 5%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, or greater than or equal to 90%. In certain embodiments, the secondary precursor component is cured upon exposure to air having a humidity of less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, less than or equal to 10%, less than or equal to 5%, or less than or equal to 2%. Combinations of the above-referenced ranges are also possible (e.g., greater than or equal to 1% and less than or equal to 100%). Other ranges are also possible.

Prior to curing, the first and second secondary precursor species may reside in the same curable material (for example, in the same pot or in the same chamber of a cartridge, or in the same "green" article), while the first secondary precursor species remains physically isolated or substantially physically isolated from the second secondary precursor species, thereby preventing premature curing. For example, the first precursor species of the secondary component may be encapsulated by a shell which presents a physical barrier physically isolating it from the second precursor species to prevent curing. In another example, the first species is present in the resin in an insoluble particle or a powder form, allowing only a small fraction of that precursor species (e.g., the small percentage of material at the surface of each particle) to be exposed to another precursor species, thereby substantially physically isolating the precursor species from one another. The physical isolation of the precursor species may then be eliminated upon the occurrence of an initiating event, allowing the precursors to mix and cure. For example, where one of the precursor species is encapsulated, the initiating event may be a degrading event—an event which causes the encapsulating shell to degrade and release the formerly physically isolated precursor species. In embodiments in which one of the precursors is suspended in particle form, the initiating event may be a dissolving event—an event which causes the particle comprising the precursor species to dissolve and release the formerly substantially physically isolated precursor species. The degrading or dissolving event may comprise any of application of heat or mechanical force (e.g., vibrational force), or introduction of a chemical species (e.g., a solvent or catalyst). Other mechanisms are also possible.

EXAMPLES

The following examples illustrate embodiments of certain aspects of the invention. It should be understood that the methods and/or materials described herein may be modified and/or scaled, as known to those of ordinary skill in the art.

Example 1

The following example describes an exemplary article formed using the methods described herein and having relatively 'soft' mechanical properties including a relatively high elongation (at break).

A ratio of 30 wt % of a first (primary cure) precursor component and 70 wt % second (secondary cure) precursor component were mixed together.

The first (primary cure) precursor component comprised at least a monofunctional acrylic monomer, a difunctional urethane-acrylate monomer, a difunctional acrylic monomer and a photoinitiator.

The second (secondary cure) precursor component comprised an isocyanate terminated prepolymer.

The first precursor component and second precursor component were cured as described herein, producing a material with a Shore A hardness of 60, tensile strength of 13 MPa, and elongation (at break) of 245%.

Example 2

The following example describes an exemplary article formed using the methods described herein and having a relatively high rigidity, including a relatively high Shore A hardness and relatively high tensile strength.

A ratio of 35 wt % of a first (primary cure) precursor component and 65 wt % second (secondary cure) precursor component were mixed together.

The first (primary cure) precursor component comprised at least a monofunctional acrylic monomer, a difunctional urethane-acrylate monomer, a difunctional acrylic monomer and a photoinitiator.

The second (secondary cure) precursor component comprised an isocyanate terminated prepolymer.

The first precursor component and second precursor component were cured as described herein, producing a material with a Shore A hardness of 90, tensile strength of 23 MPa, and elongation (at break) of 196%.

Example 3

The following example describes an exemplary article formed using the methods described herein and having a relatively high Shore A hardness and a relatively high elongation (at break).

A ratio of 30 wt % of a first (primary cure) precursor component and 70 wt % second (secondary cure) precursor component were mixed together.

The first (primary cure) precursor component comprised a difunctional urethane-acrylate monomer, a monofunctional acrylic monomer and a photoinitiator.

The second (secondary cure) precursor component comprised an isocyanate terminated prepolymer.

The first precursor component and second precursor component were cured as described herein, producing a material with a Shore A hardness of 84, tensile strength of 16 MPa, and elongation (at break) of 491%.

Example 4

The following example describes an exemplary article formed using the methods described herein and having a relatively low elongation (at break).

A ratio of 40 wt % of a first (primary cure) precursor component and 60 wt % second (secondary cure) precursor component were mixed together.

The first (primary cure) precursor component comprised a difunctional urethane-acrylate monomer, a monofunctional acrylic monomer, a difunctional acrylic monomer, and a photoinitiator.

The second (secondary cure) precursor component comprised an isocyanate terminated prepolymer.

The first precursor component and second precursor component were cured as described herein, producing a material with a Shore A hardness of 82, tensile strength of 14 MPa, and elongation (at break) of 166%.

Example 5

The following example describes an exemplary article formed using the methods described herein including an aliphatic precursor component.

A ratio of 35 wt % of a first (primary cure) precursor component and 65 wt % second (secondary cure) precursor component were mixed together.

The first (primary cure) precursor component comprised a monofunctional acrylic monomer, a difunctional acrylic monomer, a difunctional urethane-acrylate monomer, and a photoinitiator.

The second (secondary cure) precursor component comprised an isocyanate terminated prepolymer.

The first precursor component and second precursor component were cured as described herein, producing a material with a Shore A hardness of 70, tensile strength of 5 MPa, and elongation (at break) of 147%.

Example 6

The following example describes an exemplary article formed using the methods described herein.

A ratio of up to 85 wt % of a second (secondary cure) precursor component and remainder first (primary cure) precursor component were mixed together. The formed article having a relatively high elongation at break, a relatively high elasticity and rebound resilience.

Example 7

The following example describes an exemplary article formed using the methods described herein.

A ratio of up to 90-95 wt % of a first (primary cure) precursor component and remainder second (secondary cure) precursor component were mixed together. The formed article having a relatively higher elongation and elasticity (as compared to an article formed from the curing of the first (primary cure) precursor component alone).

Example 8

The following example describes an exemplary article formed using the methods described herein.

A ratio of up to 40 wt % of a first (primary cure) precursor component and the remainder second (secondary cure) precursor component were mixed together.

The first precursor component comprised a difunctional urethane-acrylate oligomer, a monofunctional acrylic monomer and a photoinitiator.

The second precursor component comprised an isocyanate terminated prepolymer.

The first precursor component and second precursor component were cured as described herein, producing a material with a Shore D hardness of 65, tensile strength of 32 MPa, and elongation (at break) of 165%.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Having described several embodiments in detail, various modifications and improvements will readily occur to those skilled in the art.

What is claimed is:

1. A method of producing an additively-manufactured article, the method comprising:
providing a curable material comprising a first precursor component and at least a second precursor component, different than the first precursor component, wherein the first precursor component is configured to cure when subjected to an effective amount of actinic radiation and the second precursor component is configured to cure when subjected to moisture or gas;
exposing the curable material to actinic radiation within an enclosure to produce an intermediate polymeric structure, wherein the second precursor component is suspended in such intermediate polymer structure;
operating a chemical and/or mechanical dehumidifier such that the humidity within the enclosure is maintained below a threshold for curing of the second precursor component; and
subsequent to producing the intermediate polymeric structure, exposing the intermediate polymeric structure to moisture or gas sufficient to at least partially cure the second precursor component, thereby producing the article.

2. A method as in claim 1, wherein the curable material comprises a mixture of the first precursor component and the second precursor component.

3. A method as in claim 1, wherein the curable material is formed by mixing the first precursor component and the second precursor component prior to providing the curable material.

4. A method as in claim 1, wherein the first precursor component comprises an acrylic or derivatives thereof.

5. A method as in claim 1, wherein the first precursor component comprises a photoinitiator, a pigment, a dye, an additive, and/or a filler.

6. A method as in claim 1, wherein the second precursor component comprises an isocyanate or derivatives thereof.

7. A method as in claim 1, wherein the second precursor component comprises a pigment, a dye, an additive, and/or a filler.

8. A method as in claim 1, wherein the curable material is a liquid.

9. A method as in claim 1, wherein the first precursor component comprises a photo-polymerizable compound.

10. A method as in claim 1, wherein the curable material is configured to have a shelf-life of at least 1 month.

11. A method as in claim 1, wherein the additively-manufactured article comprises an interpenetrating polymer network.

12. A method as in claim 1, wherein the additively-manufactured article has an elongation at break of greater than or equal to 125%.

13. A method as in claim 1, wherein the additively-manufactured article has a Shore A hardness of greater than or equal to 50.

14. A method as in claim 1, wherein the additively-manufactured article has a tensile strength of greater than or equal to 5 MPa.

15. A method as in claim 1, wherein a ratio of the first precursor component to the second precursor component in the curable material is greater than or equal to 15:85 and less than or equal to 95:5.

16. A method as in claim 1, wherein the second precursor component comprises an isocyante terminated monomer or oligomer.

17. A method as in claim 1, wherein the second precursor component comprises a monomer or oligomer comprising a urethane, ester, or ether species.

18. A method as in claim 1, wherein the second precursor component comprises a catalyst.

19. A method as in claim 1, wherein the first precursor component comprises a photoinitiator.

20. A method of forming an article in an additive fabrication device configured to fabricate the article by forming layers of solid material on a build platform, the method comprising:

forming an intermediate polymeric structure, said forming the intermediate polymeric structure comprising:

provolving a curable material comprising a first precursor component and at least a second precursor component, different than the first precursor component, over the build platform in an enclosure;

forming a first layer by at least partially curing the first precursor component;

providing the curable material on the first formed layer; and forming a second layer by at least partially curing the first precursor component of the curable material deposited on the first layer, dehumidifying, using a chemical and/or mechanical dehumidifier, at least a portion of the air within the enclosure during the steps of forming the first layer and forming the second layer, such that humidity within the enclosure is maintained below a threshold for curing of the second precursor component; and subsequently to producing the intermediate polymeric structure, at least partially curing the second precursor component in the first layer and the second layer.

21. A method as in claim 20, wherein at least partially curing the first precursor component comprises exposing the first precursor component to an effective amount of actinic radiation.

22. A method as in claim 20, wherein at least partially curing the second precursor component comprises exposing the article to humidity, heat, and/or an effective amount of actinic radiation.

23. A method as in claim 22, wherein the effective amount of actinic radiation for curing the second precursor component is different than the effective amount of actinic radiation for curing the first precursor component.

24. A method as in claim 20, wherein at least partially curing the first precursor component comprises exposing the curable material to a humidity of less than or equal to 50%.

25. A method as in claim 22, wherein at least partially curing the second precursor component comprises exposing the article to a humidity of greater than or equal to 1% and less than or equal to 100%.

26. A method as in claim 20, wherein the first precursor component comprises an acrylic or derivatives thereof.

27. A method as in claim 20, wherein the second precursor component comprises an isocyanate or derivatives thereof.

28. A method as in claim 20, wherein the curable material is a liquid.

29. A method as in claim 20, wherein the ratio of the first precursor component to the second precursor component in the curable material is greater than or equal to 15:85 and less than or equal to 95:5.

30. A method as in claim 20, wherein the second precursor component comprises a monomer or oligomer comprising a urethane, ester, or ether species.

* * * * *